Figure 1:
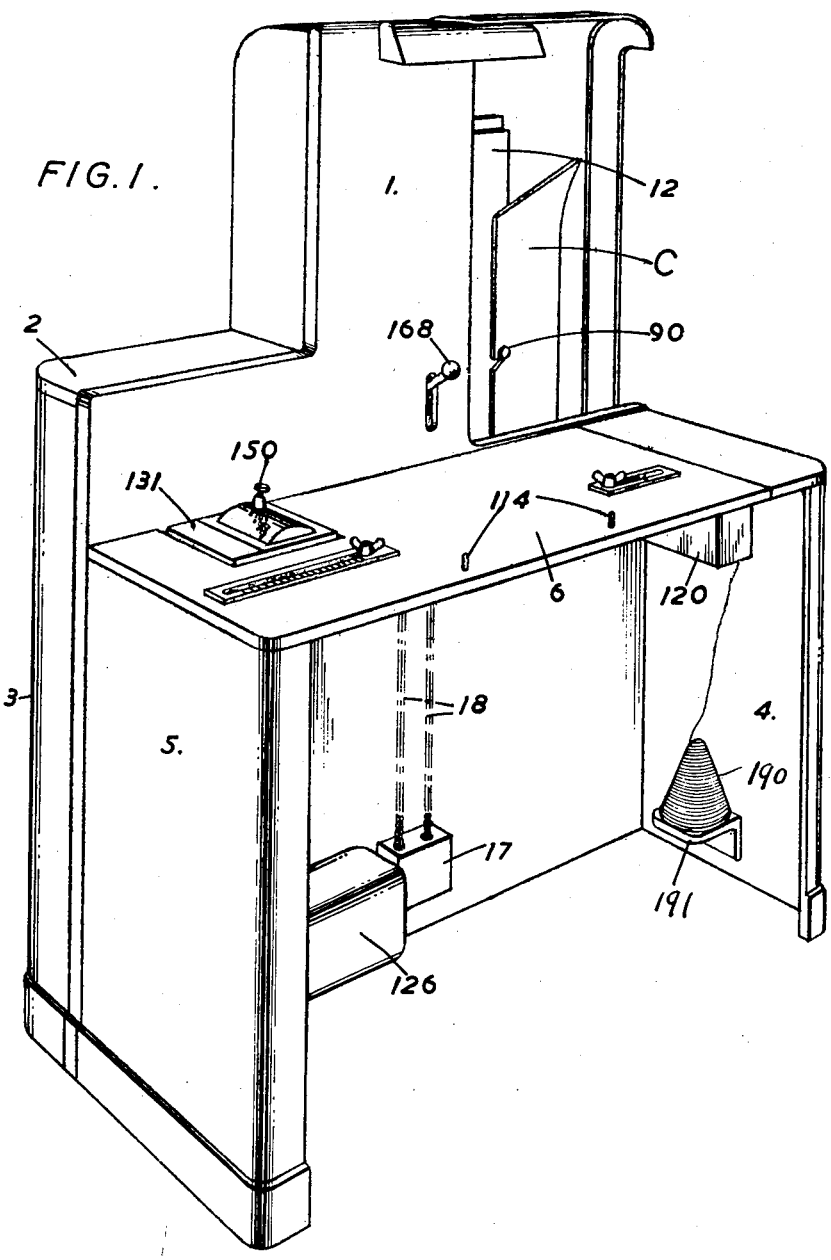

July 17, 1956　　F. B. HOLMES-HIGGIN　　2,754,780
SEWING MACHINES
Filed Nov. 28, 1952　　19 Sheets-Sheet 2

Inventor
Francis Beckwith Holmes-Higgin,
By
Attorney

July 17, 1956     F. B. HOLMES-HIGGIN     2,754,780
SEWING MACHINES
Filed Nov. 28, 1952     19 Sheets-Sheet 4

Inventor
Francis Beckwith Holmes-Higgin,
By
Attorney

July 17, 1956  F. B. HOLMES-HIGGIN  2,754,780
SEWING MACHINES
Filed Nov. 28, 1952  19 Sheets-Sheet 7

Inventor
Francis Beckwith Holmes-Higgin,
By
Attorney

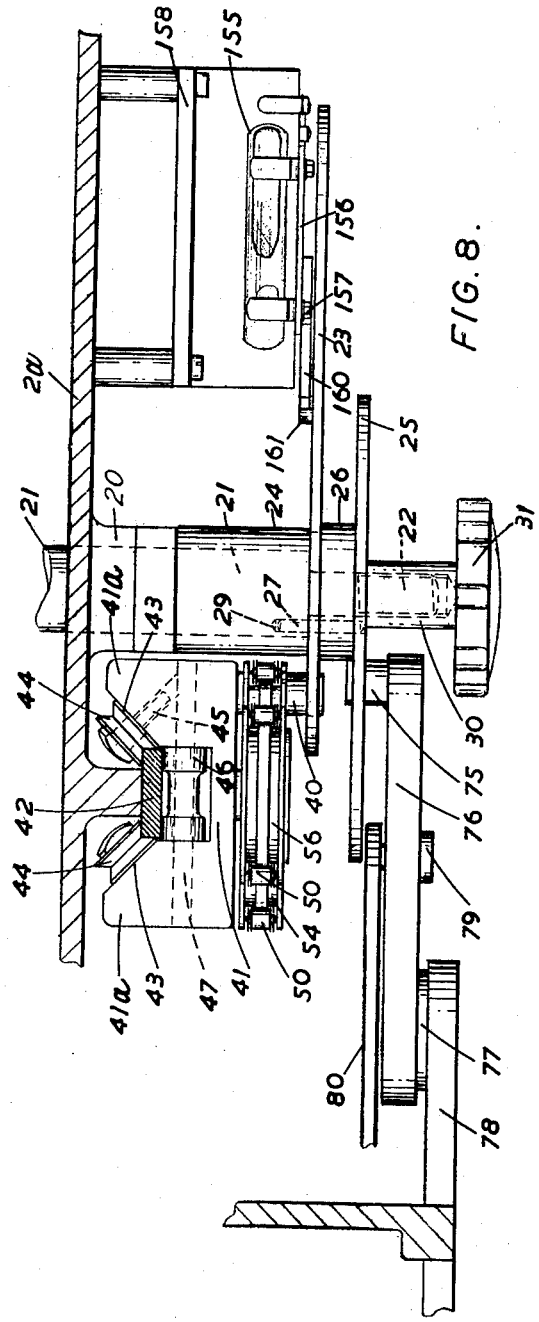

July 17, 1956 F. B. HOLMES-HIGGIN 2,754,780
SEWING MACHINES
Filed Nov. 28, 1952 19 Sheets-Sheet 9
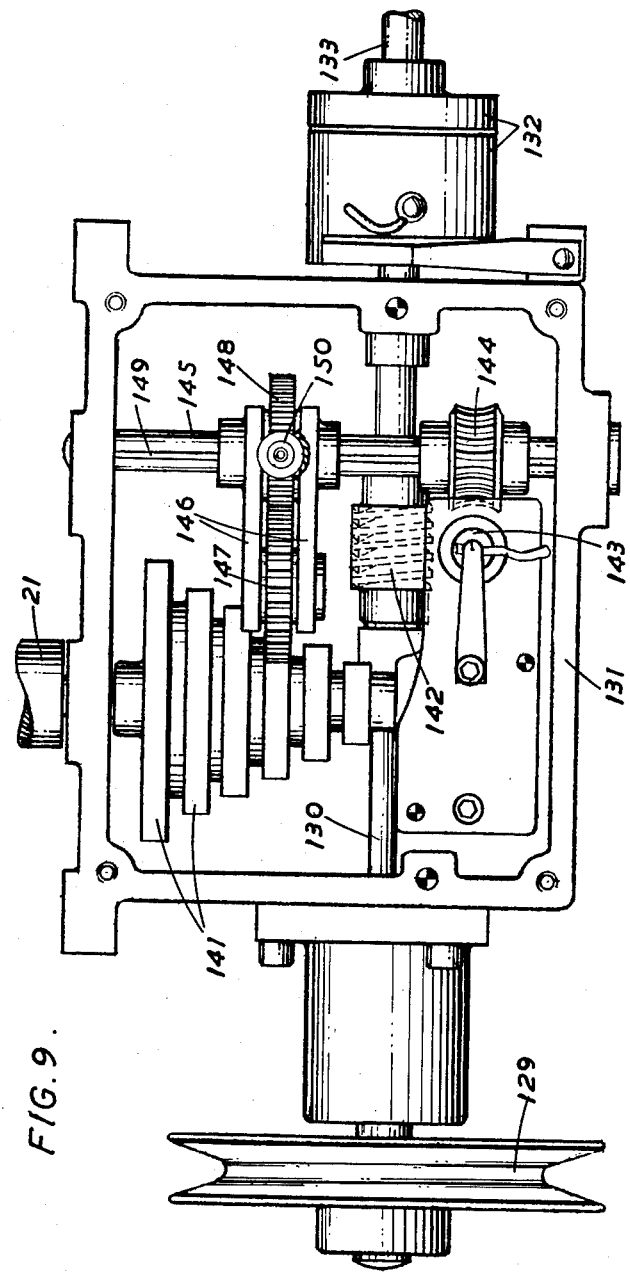
FIG. 9.
Inventor
Francis Beckwith Holmes-Higgin,
By
Attorney July 17, 1956 F. B. HOLMES-HIGGIN 2,754,780
SEWING MACHINES
Filed Nov. 28, 1952 19 Sheets-Sheet 10

Inventor
Francis Beckwith Holmes-Higgin,
By
Attorney

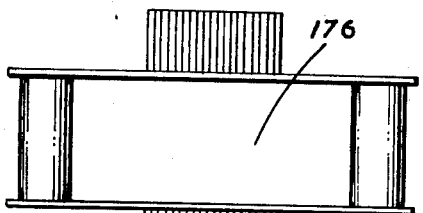
FIG. 11.
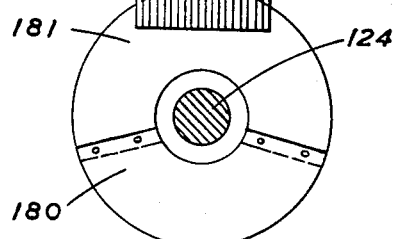
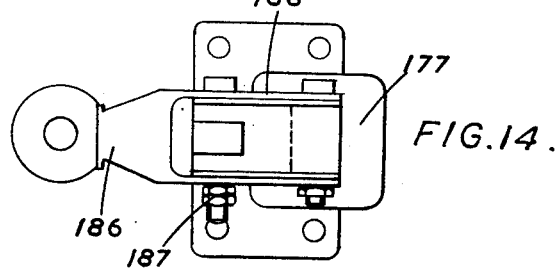
FIG. 14.
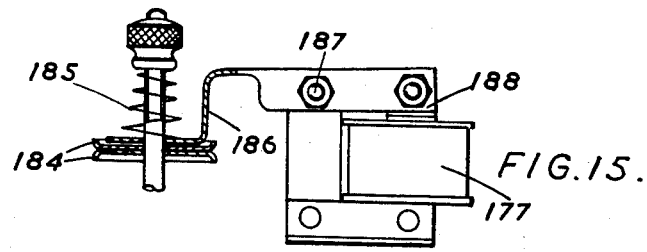
FIG. 15.
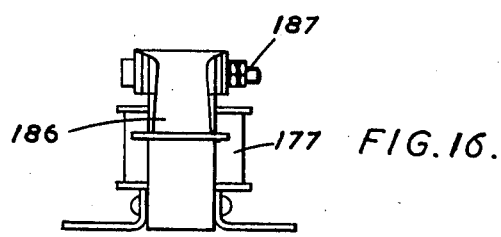
FIG. 16.
Inventor
Francis Beckwith Holmes-Higgin,
By
Attorney July 17, 1956  F. B. HOLMES-HIGGIN  2,754,780
SEWING MACHINES
Filed Nov. 28, 1952  19 Sheets-Sheet 12
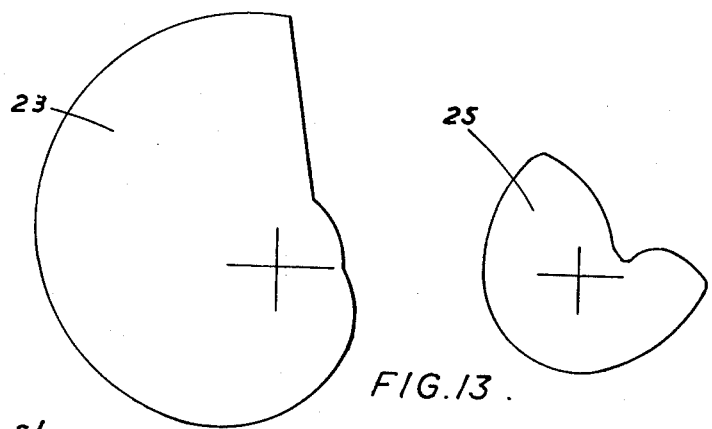
FIG. 13.
FIG. 12.
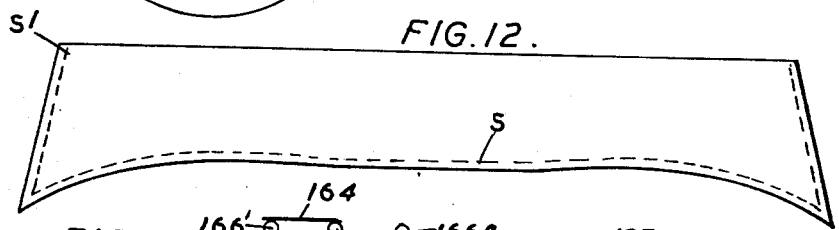
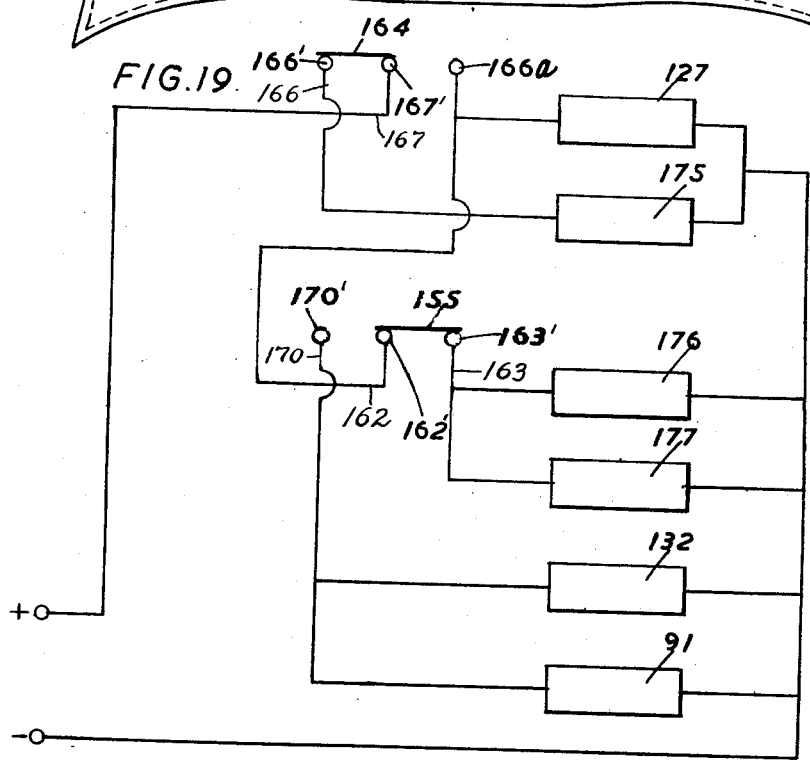
FIG. 19.
Inventor
Francis Beckwith Holmes-Higgin,
By
Attorney July 17, 1956 F. B. HOLMES-HIGGIN 2,754,780
SEWING MACHINES
Filed Nov. 28, 1952 19 Sheets-Sheet 13
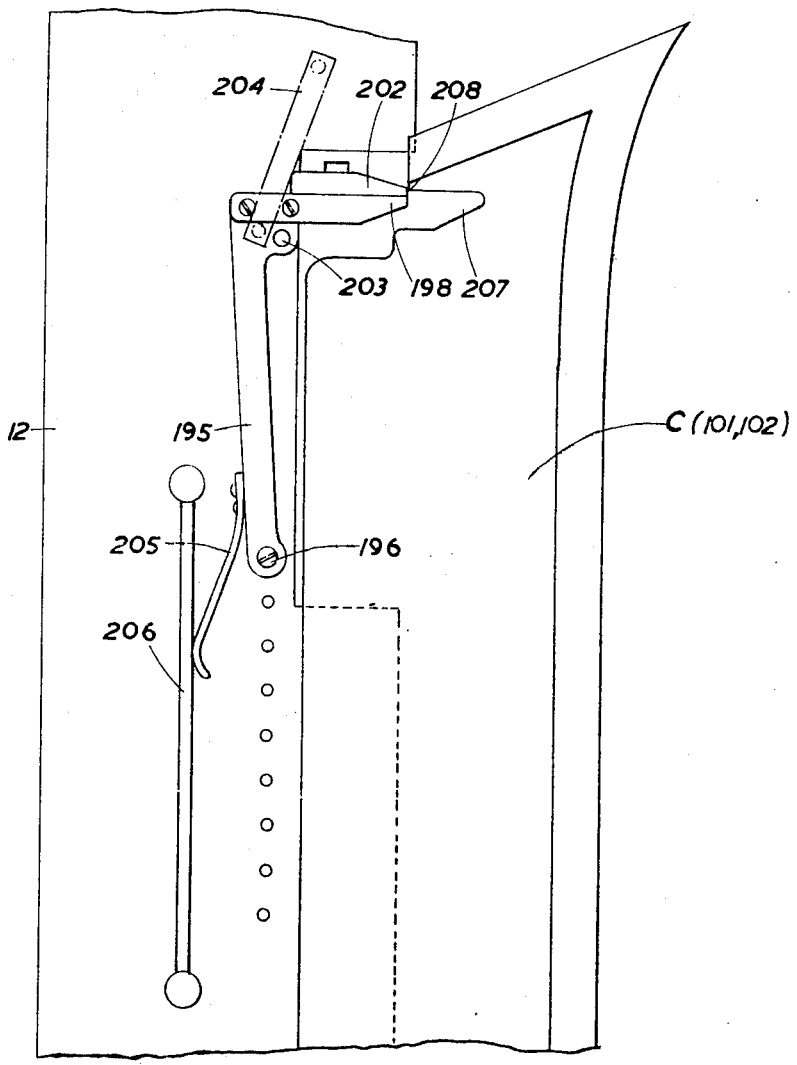
FIG. 17.
FIG. 18.
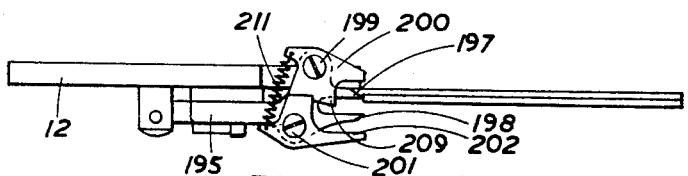

July 17, 1956  F. B. HOLMES-HIGGIN  2,754,780
SEWING MACHINES
Filed Nov. 28, 1952  19 Sheets—Sheet 14
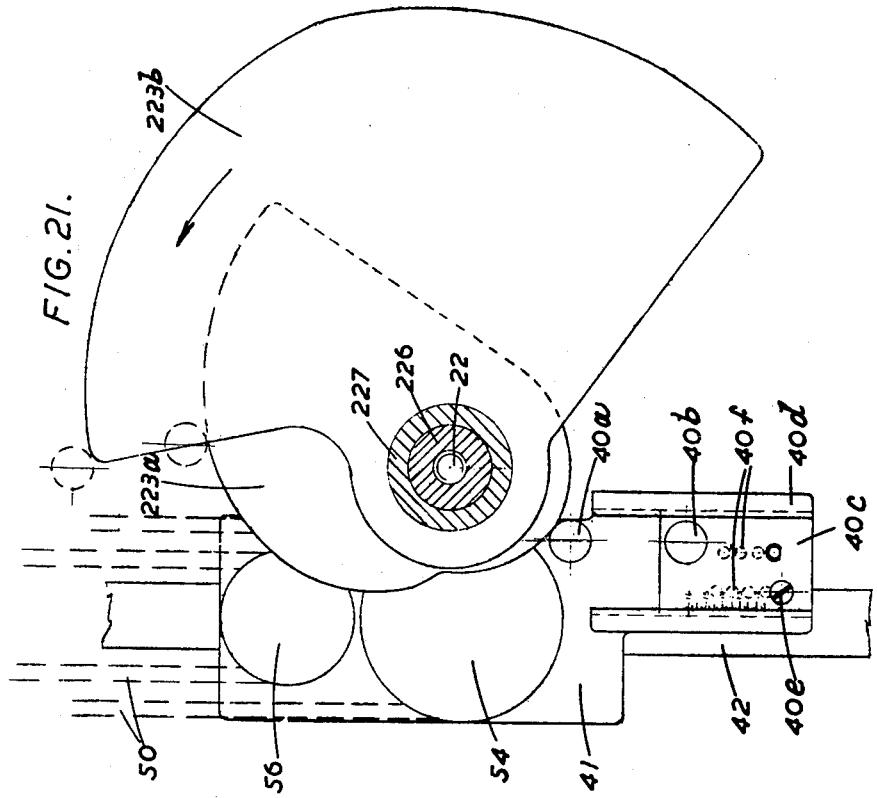
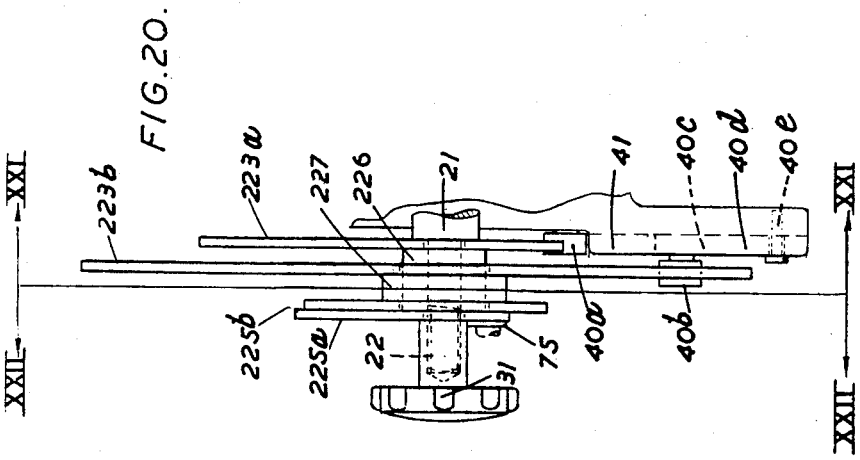
Inventor
Francis Beckwith Holmes-Higgin,
By
Attorney

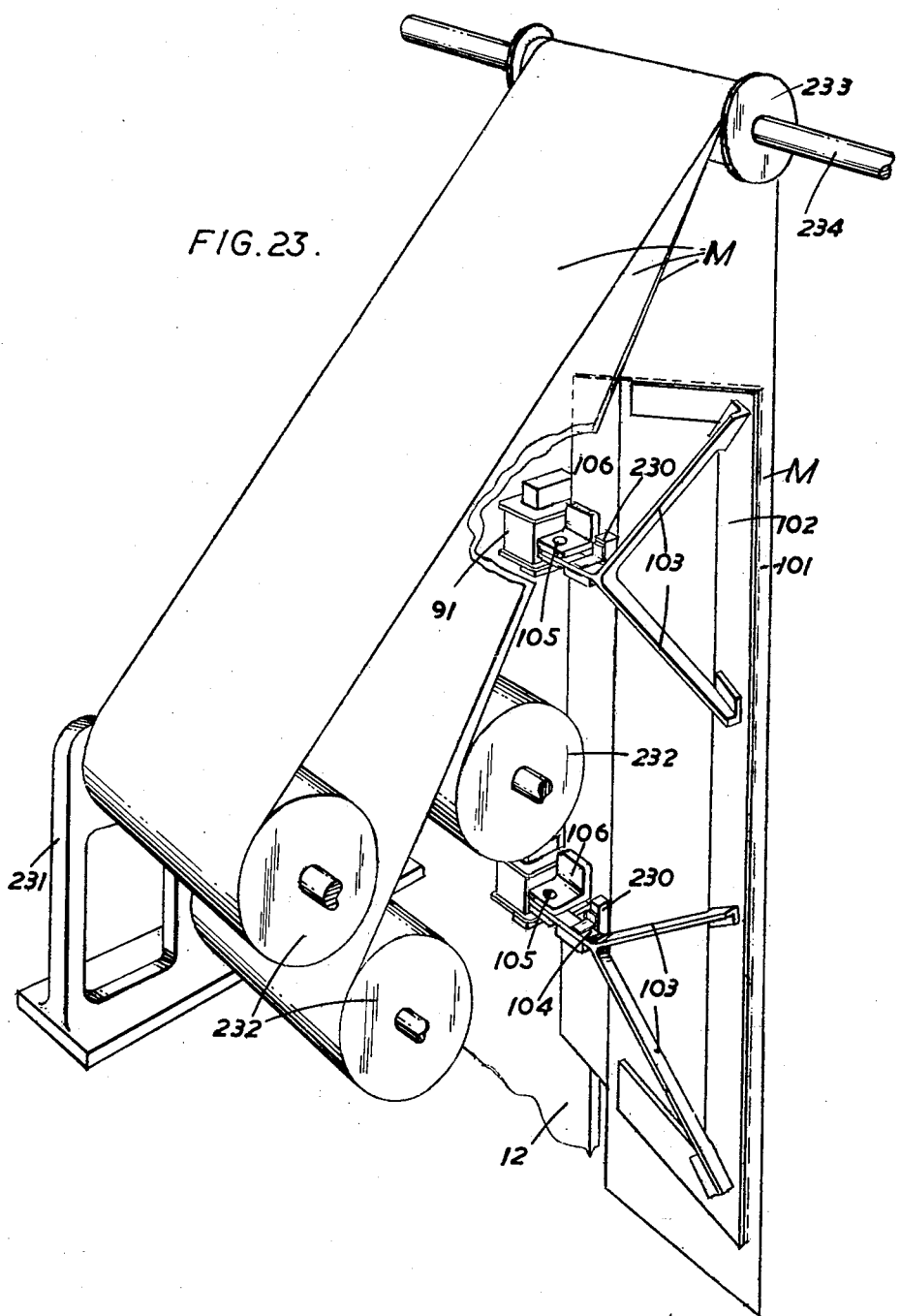

July 17, 1956  F. B. HOLMES-HIGGIN  2,754,780
SEWING MACHINES
Filed Nov. 28, 1952  19 Sheets-Sheet 16
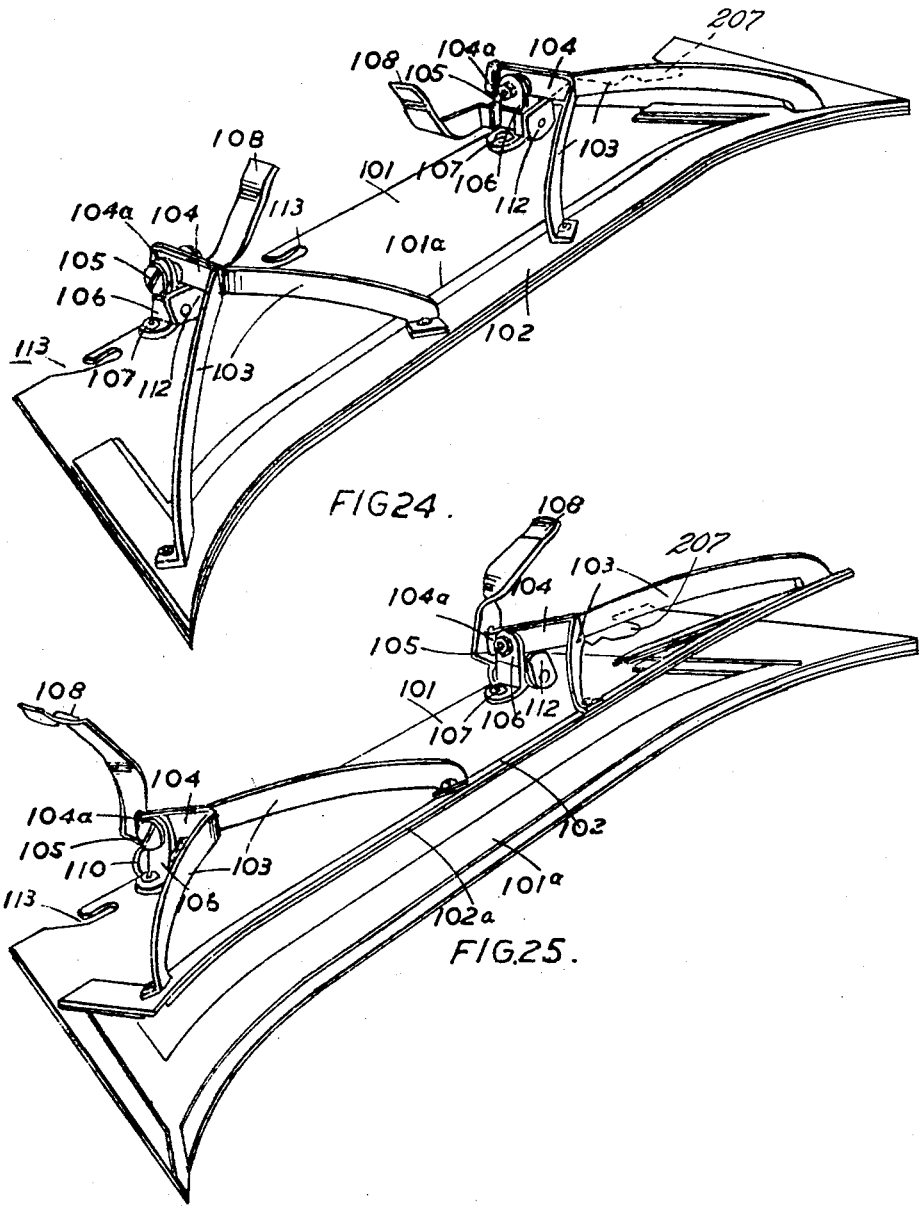
FIG.24.
FIG.25.

July 17, 1956 F. B. HOLMES-HIGGIN 2,754,780
SEWING MACHINES
Filed Nov. 28, 1952 19 Sheets-Sheet 17

Inventor
Francis Beckwith Holmes-Higgin,
By
Attorney

July 17, 1956  F. B. HOLMES-HIGGIN  2,754,780
SEWING MACHINES
Filed Nov. 28, 1952  19 Sheets-Sheet 18

FRANCIS B. HOLMES-HIGGIN
INVENTOR

July 17, 1956  F. B. HOLMES-HIGGIN  2,754,780
SEWING MACHINES
Filed Nov. 28, 1952  19 Sheets-Sheet 19

FRANCIS B. HOLMES-HIGGIN
INVENTOR

United States Patent Office 2,754,780
Patented July 17, 1956

2,754,780
SEWING MACHINES
Francis Beckwith Holmes-Higgin, Sevenoaks, England
Application November 28, 1952, Serial No. 322,876
Claims priority, application Great Britain November 30, 1951

6 Claims. (Cl. 112—2)

This invention relates to sewing machines.

Hitherto the material to be stitched has been passed under the needle by using the material itself to provide the amount of movement required in the making of each stitch, and while various guides have been provided to simplify the maintenance of the correct line of stitching, the skill of the operator has been the predominant factor in controlling the shape of the stitch line.

The object of the present invention is to provide a construction of sewing machine which can be pre-set to produce any desired shape of stitch line under automatic control instead of under control of the operator, whose duties are confined to feeding the machine with the required material.

According to the present invention, a sewing machine comprises a stitch-forming device, a holder for the material to be stitched and means for moving the holder relatively to the stitch-forming device under the control of guide means acting on the holder to cause a given point thereon to trace out a predetermined path relative to the stitch-forming device.

The material holder may be mounted on a secondary carriage which is movable along a primary carriage in a path at right angles to the path of movement of said primary carriage, while means are provided for controlling the respective rates of movement of the carriages in such a way that a given point on the secondary carriage traces out the desired predetermined path relative to the stitch-forming device.

Figure 2:
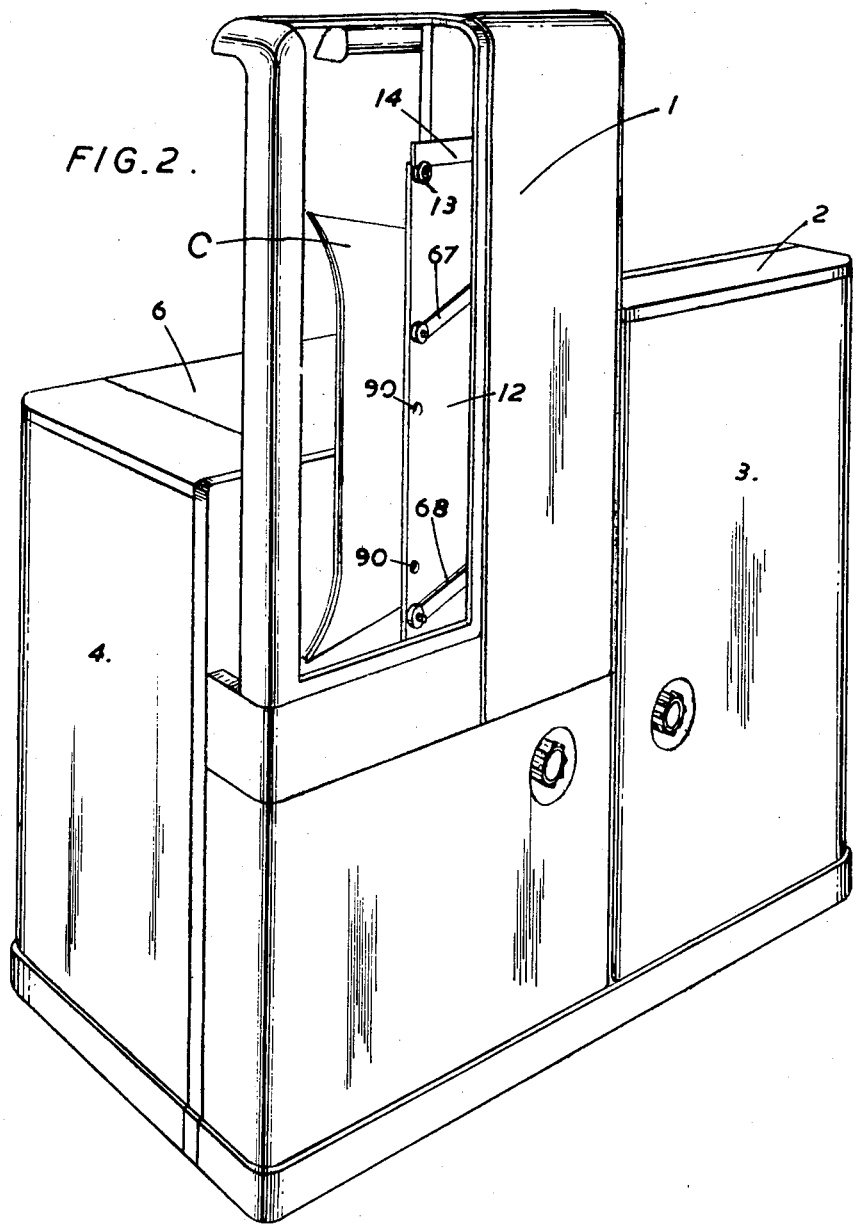
Figure 3:
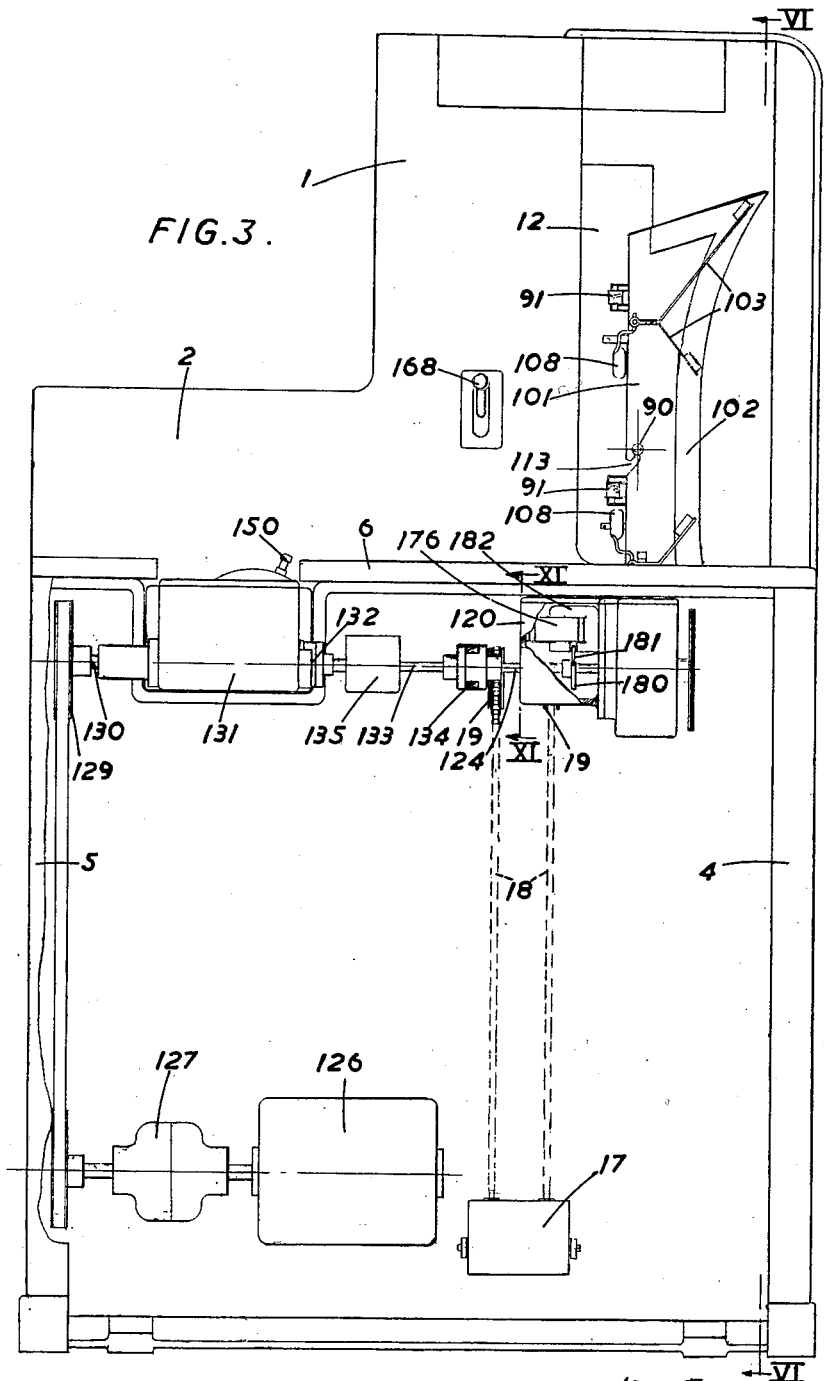
Figure 4:
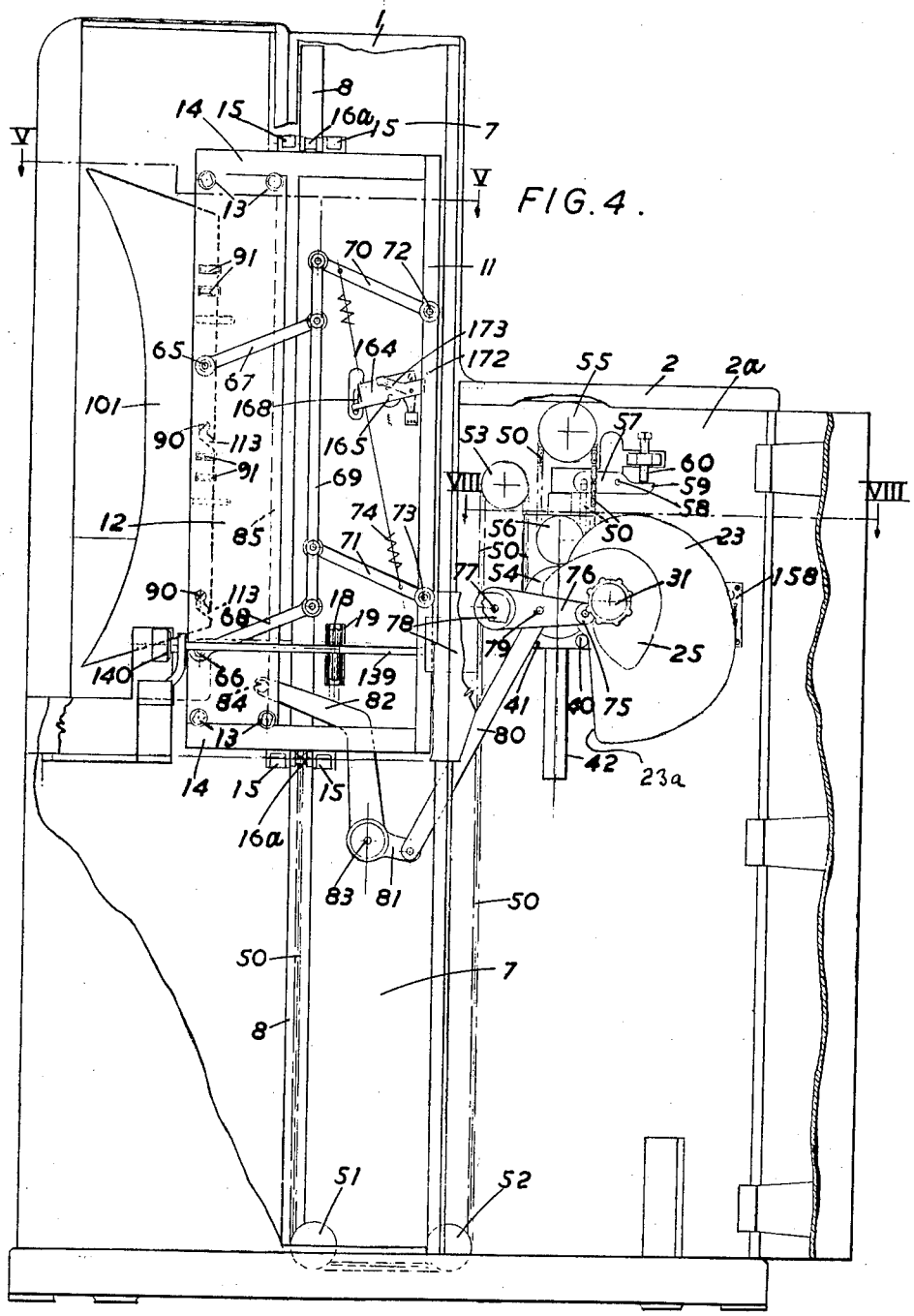
Figure 5:
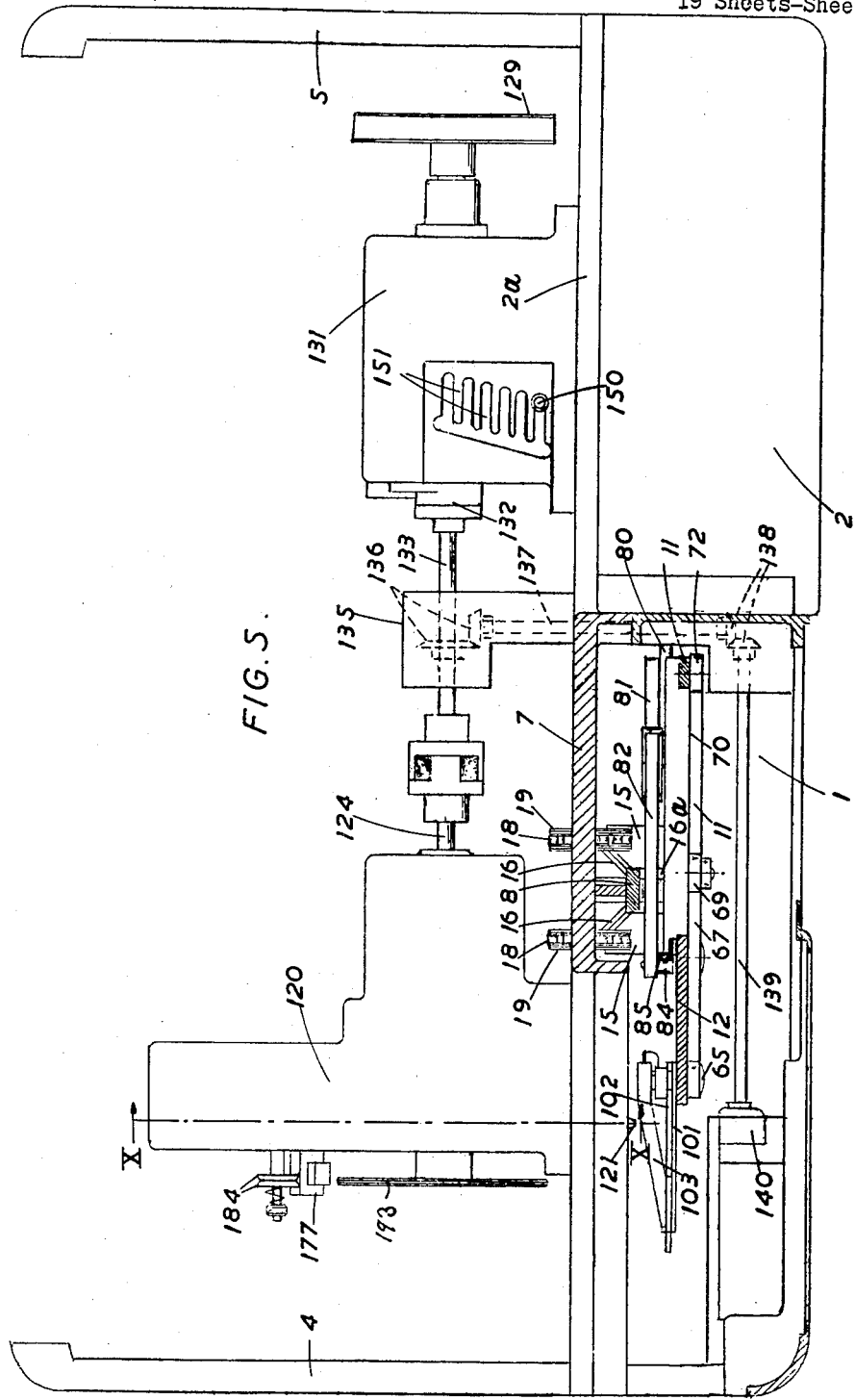
Figure 6:
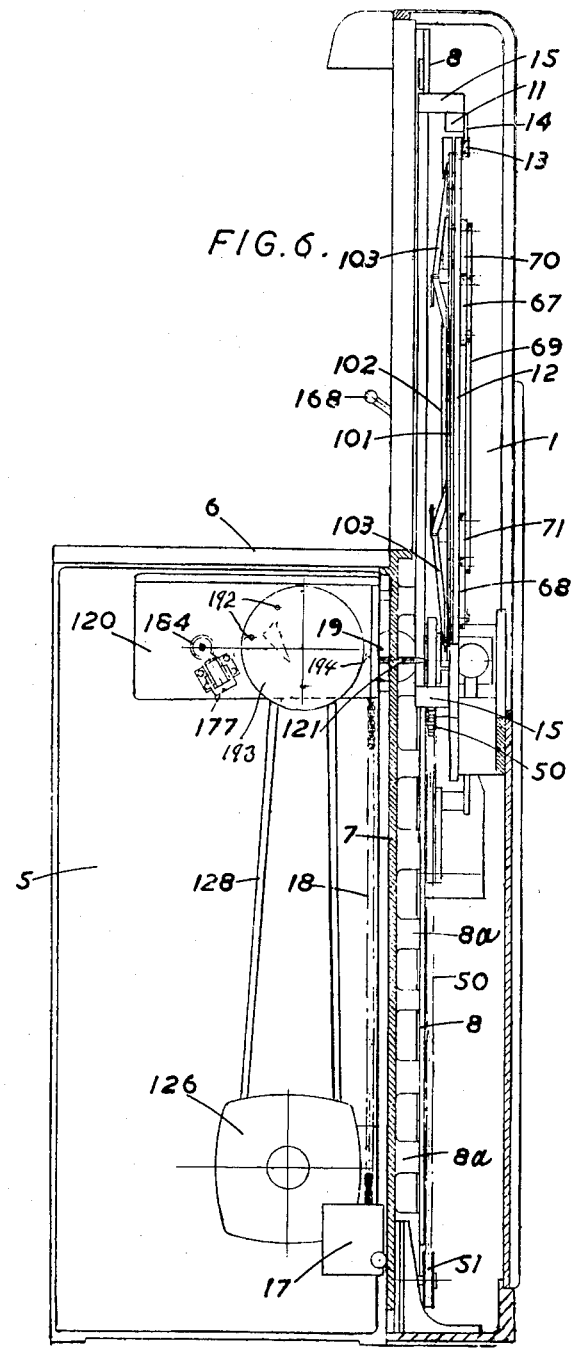
Figure 7:
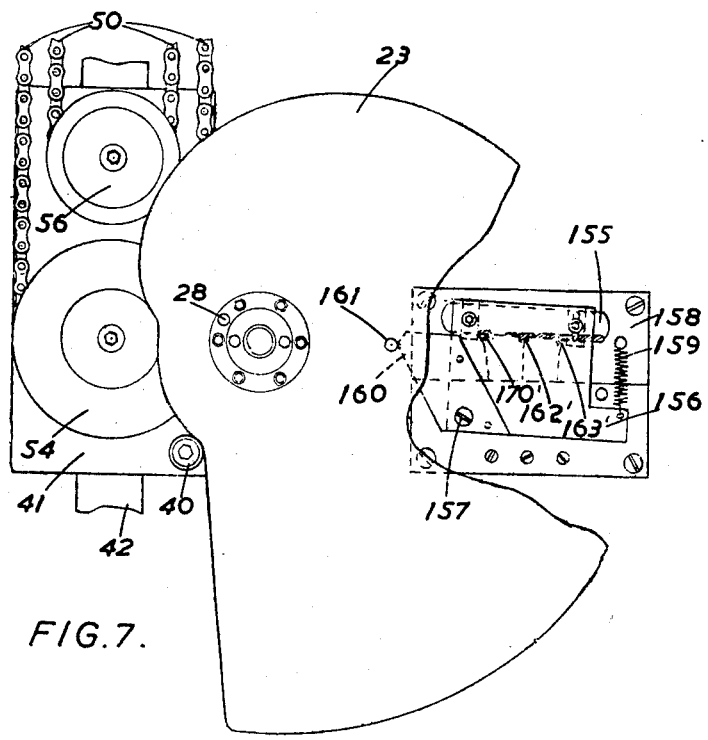
Figure 22:
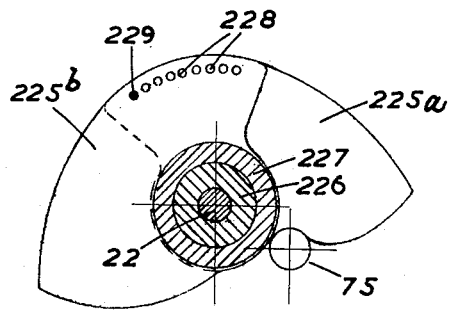
Figure 10:
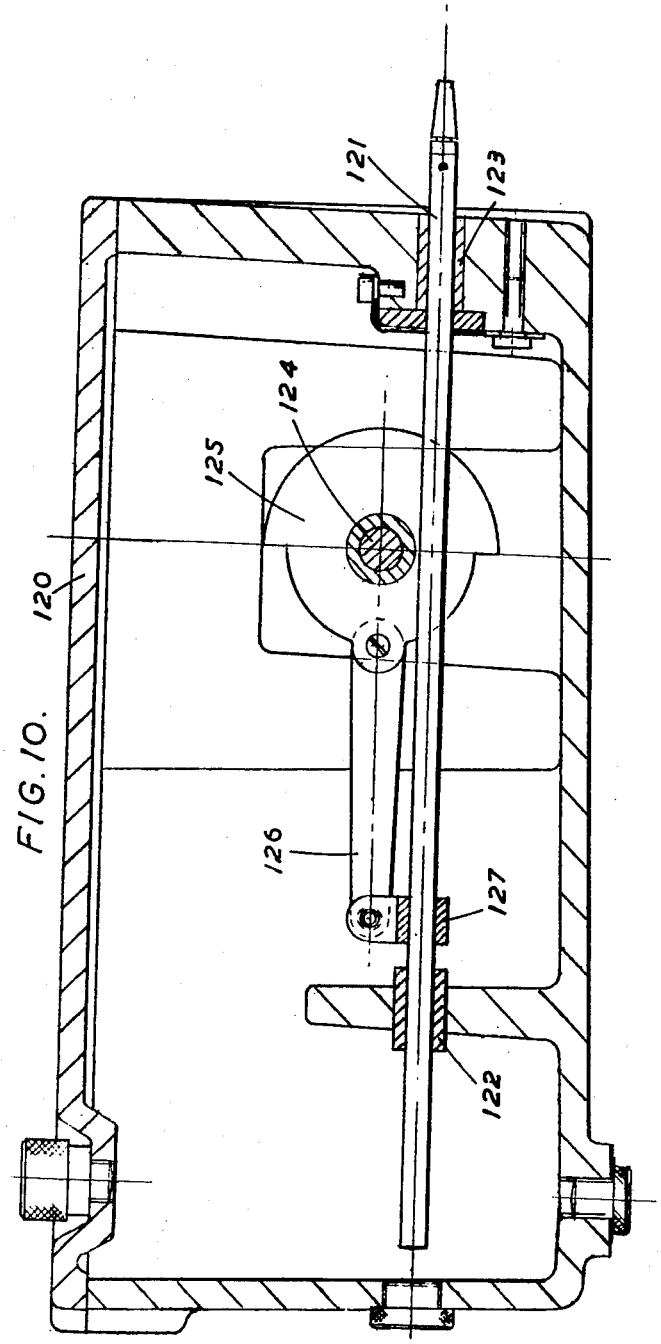
Figure 26:
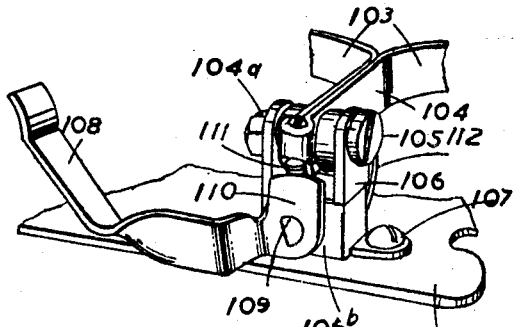
Figure 27:
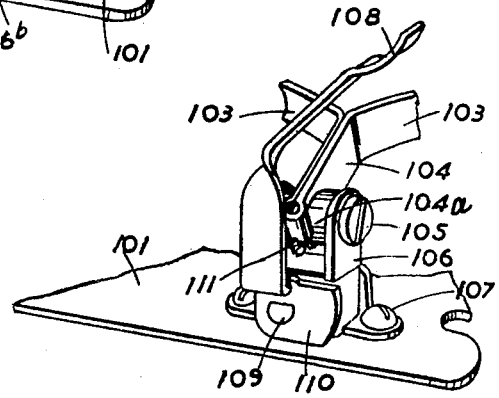
Figure 28:
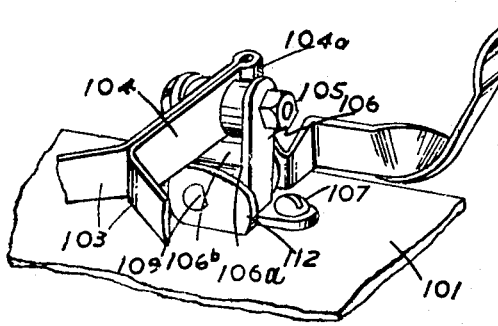
Figure 29:
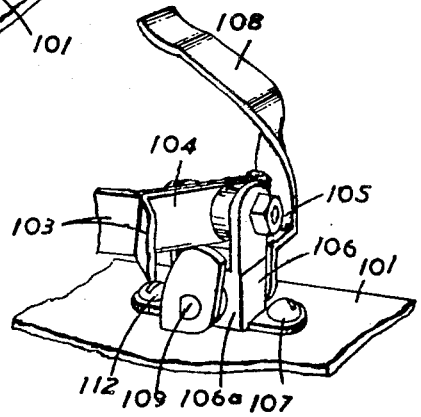
Figure 30:
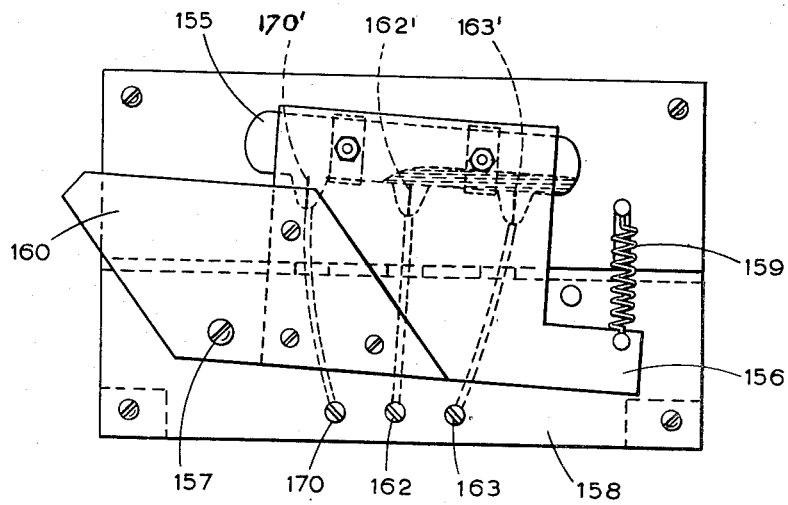
Figure 31:
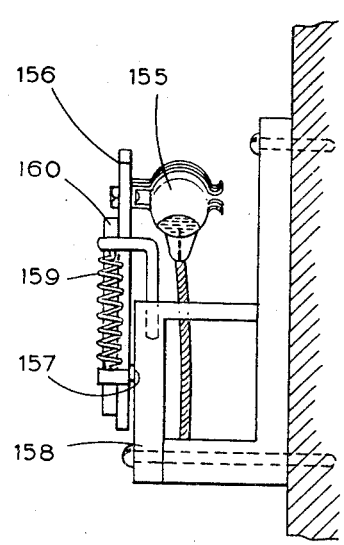
Figure 32:
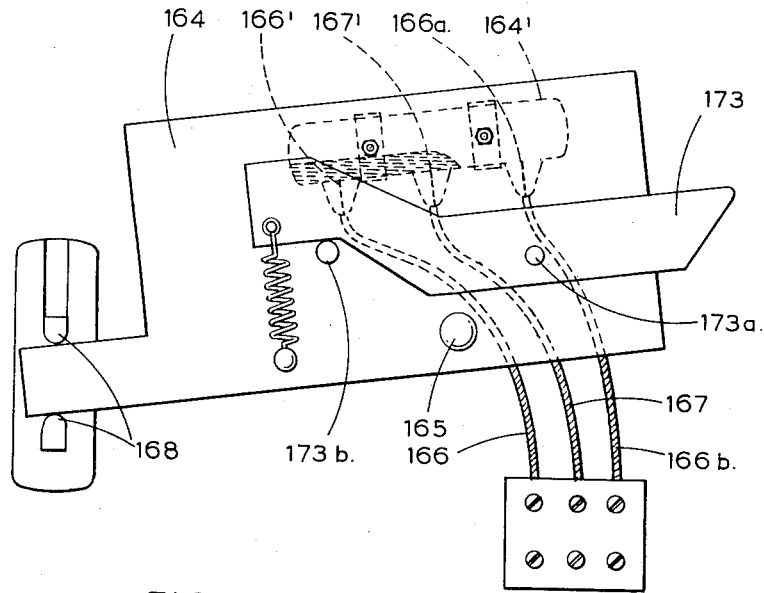
Figure 33:
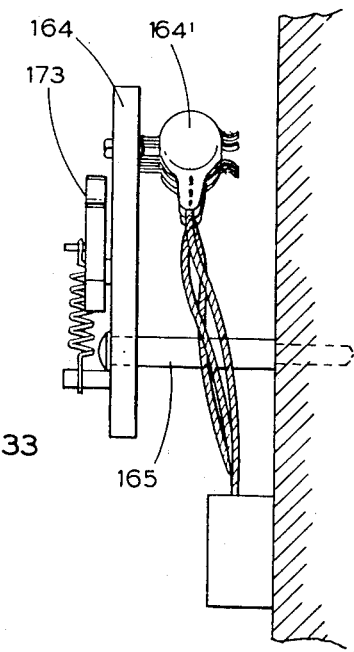

In order that the invention may be more clearly understood, two embodiments thereof will now be described by way of example with reference to the accompanying drawings in which:

Figure 1 is a front perspective view;
Figure 2 is a rear perspective view;
Figure 3 is a front elevation;
Figure 4 is a rear elevation;
Figure 5 is a sectional plan on line V—V in Figure 4;
Figure 6 is an end view in section on line VI—VI in Figure 3;
Figure 7 shows one of the controlling cams;
Figure 8 shows a section on line VIII—VIII in Figure 4;
Figure 9 is a plan of gear box with cover removed;
Figure 10 is a section on line X—X in Figure 5;
Figure 11 is a section on line XI—XI in Figure 3;
Figure 12 shows one shape of collar which can be hemmed on the apparatus shown in Figures 1 to 11;
Figure 13 shows the shape of the cams for hemming the collar shape shown in Figure 12;
Figure 14 shows the thread tensioning device in elevation;
Figure 15 is a plan of the thread tensioning device;
Figure 16 is a view looking from the left in Figure 15;
Figure 17 shows the thread-cutting device in elevation;
Figure 18 shows the thread-cutting device in plan;
Figure 19 is a wiring diagram for the machine shown in Figures 1 to 18.
Figure 20 shows in end elevation an arrangement of two-part cams adjustable to permit the stitching of pieces of material of the same general shape but varying in length;
Figure 21 is a section on the line XXI—XXI in Figure 20;
Figure 22 is a section on the line XXII—XXII in Figure 20;
Figure 23 shows in perspective how material from one or more rolls can be fed to the clamping device;
Figure 24 shows in perspective and in the closed position the clamp for holding the material to be stitched;
Figure 25 shows the clamp in the open position;
Figure 26 illustrates mechanism for opening the clamp and for pressing the clamping elements together when closed, the parts being viewed from the rear and shown in the positions which they occupy when the clamp is closed;
Figure 27 is a view of the mechanism shown in Figure 26 with the parts in the open position;
Figure 28 is a view corresponding to Figure 26 but seen from the front;
Figure 29 is a view corresponding to Figure 27 also seen from the front;
Figure 30 is a detail front elevational view of a switch unit;
Figure 31 is an end elevational view of one of the switch units; and
Figures 32 and 33 are, respectively, views similar to Figures 30 and 31 of another switch unit of the mechanism.

In the embodiment shown in Figures 1 to 18, the machine (shown generally in Figures 1 and 2) comprises an upright casing 1 housing the two carriages, their guides, and the clamp, indicated at C in Figures 1 and 2, a casing 2 housing the control cams, and provided at the rear with a removable cover 3, two forwardly extending end frame members 4 and 5 and a removable bench plate 6 supported across the tops of the members 4 and 5.

Attached to the forward wall 7 of the casing 1 by lugs is a vertical guide rail 8 for the first carriage 11, which is in the form of an open frame and moves vertically.

The second carriage 12, which moves horizontally is in the form of a plate and is guided by rollers 13 engaging rails 14 attached to the upper and lower horizontal members, of the carriage 11.

Each of the upper and lower horizontal members of carriage 11 carries a forwardly projecting block 15, (shown in Figure 5 for the lower horizontal member) said blocks 15 embracing the guide rail 8 between them. Each block 15 has an inclined face on which is mounted a grooved guide roller 16, the guide rollers engaging the corners of the guide rail 8 as shown in Figure 5.

Mounted between the blocks 15 on a pin (not shown) passing through the blocks and fixed therein is a further guide roller 16a which runs on the rear face of the rail 8. (Figures 4 and 5).

The carriage 11 is urged upwardly by a weight 17 attached thereto by chains 18 passing over pulleys 19 and is moved downwardly when required by the following mechanism.

Passing through a boss 20 on the rear wall 2a of casing 2 (Figure 8) is a shaft 21, of which the rearward end is reduced at 22 and is screwthreaded.

A cam 23 for controlling the vertically movable carriage 11 is mounted on said shaft 21 by means of a boss 24 on the cam which is pushed on to the shaft.

A second cam 25 for controlling the horizontally moving carriage 12 has a boss 26 which is pushed on to the shaft 21.

A pin 27 carried by boss 26 passes through a hole 28 (Figure 7) in the cam 23 and enters an axial bore 29 in the shaft 21 whereby the cams are keyed together and to the shaft 21 in the correct angular relationship.

The cams are retained on the shaft by a nut in the form of an internally screwthreaded sleeve 30 carrying a knob 31 whereby it may be manually screwed on to the threaded end 22 of shaft 21, and unscrewed therefrom when it is desired to remove the cams and replace them by others of a different contour.

Cam 23 acts on a follower roller 40 carried by a block 41 (Figures 4, 7, and 8) mounted to slide vertically on a guide rail 42 attached to the rear wall 2a of casing 2.

The block 41 has inclined faces 43 at its forward side carrying grooved rollers 44 mounted in pins 45 (one only shown) said rollers 44 engaging with the corners of the rail 42.

Between cheeks 41a of the block 41 is disposed a further guide roller 46 mounted on a pin 47 passing through said cheeks 41a and fixed therein.

A chain 50 attached to the lower end of the carriage 11 passes round pulleys 51, 52, and thence up over a pulley 53 rotatably mounted on the rear wall 2a of casing 2, thence down and round a pulley 54 carried by the block 41. Chain 50 then passes upwardly and over a pulley 55 rotatably mounted on the wall 2a and thence down and round another pulley 56 mounted on the block 41 after which the chain extends upwardly to an anchor member 57 to which its end is attached. The anchor 57 is pivoted at 58 to the wall 2a and its end 59 bears against an adjustable stop 60.

Thus when cam 23 rotates, it moves block 41 downwardly, whereby the carriage 11 is pulled downwardly through chain 50 against the action of the weight 17.

The horizontally movable carriage 12 carries pivoted thereto at 65 and 66 two parallel arms 67, 68 of which the other ends are pivoted to a vertical link 69. Pivoted to said link 69 are two further parallel arms 70, 71 of which the other ends are pivoted at 72, 73 to the vertically movable carriage 11.

The links 70 and 71 are connected by a spring 74 which tends to urge carriage 12 to the left in Figure 4.

The carriage 12 is moved to the right in Figure 4 by cam 25 acting through the following mechanism.

Cam 25 acts on a follower roller 75 carried by a lever 76 pivoted at 77 to a fixed part 78. The lever 76 is pivoted at 79 to a link 80 of which the lower end is pivoted to an arm 81 formed integral with a lever 82 for actuating the carriage 12, the parts 81, 82 being mounted on a pivot 83 carried by the rear wall 7 of casing 1.

The lever 82 carries a roller 84 engaging with a vertical rail 85 attached to the carriage 12, so that when lever 82 is moved clockwise in Figure 4 the carriage 12 is thereby moved to the right, during which movement the roller 84 runs along the rail 85.

The carriage 12 carries two pins 90 for locating thereon the clamp for holding the material to be stitched and also two electromagnets 91 for holding the clamp to the carriage.

Referring to Figures 24 to 29 the clamp has a lower clamping member in the form of a rigid flat plate 101 of which the front edge and sides have a contour corresponding to that of the piece of material which is to be hemmed by a line of stitching, the piece of material being intended for making a collar.

Attached to the lower clamping plate 101 in the manner described below is an upper clamping member 102 in the form of a flat strip of rigid material having a front edge and two side edges shaped to coincide with the corresponding edges of the lower clamping member when said members are superimposed in register with one another.

The upper clamping member 102 is carried at the outer ends of two pairs of arms 103, the arms of each pair converging into a single arm 104 pivotally mounted in a pivot pin 105 supported in a bracket 106 secured to the lower clamping plate 101 by screws 107.

For each pair of arms 103 there is an operating handle 108 secured to a spindle 109 freely mounted in front and rear webs 106a, 106b of the respective bracket 106.

The handle 108 is formed with a pressure cam 110 cooperating with a pin 111 extending downwardly from the rear end 104a of the arm 104 and the spindle 109 has secured to its front end a raising cam 112.

When the clamp is closed (Figure 24) the pressure cams 110 are vertical and in contact with their respective pins 111 (Figure 26) while the raising cam 112 lies horizontally below the arm 104 (Figure 28) the cams 110 and 112 being displaced around their spindle 109 by approximately 90° so that when one is effective the other is ineffective and vice versa.

To open the clamp the handles 108 are simultaneously rocked away from one another to the positions shown in Figure 25, whereby the spindles 109 are rocked to move the pressure cams 110 clear of the pins 111 and thereafter to cause the cams 112 to raise the upper clamping member 102 by acting on arms 104.

Figures 26 and 27 show rear views of the left hand operating handle 108 in Figure 24 and its associated mechanism, the parts in Figure 26 being in the positions which they occupy when the clamp is closed, while in Figure 27 the parts are in the positions which they occupy when the clamp is open. Figures 28 and 29 show similar views of the same operating handle 108 and its associated mechanism seen from the front.

When the handle 108 is rocked clockwise in Figure 26 (counter-clockwise in Figure 28) the cam 110 is first rocked clear of the pin 111 freeing it from downward movement. Further rocking of handle 108 brings cam 112 into contact with arm 104 after which cam 112 raises arm 104 and finally moves under it to hold it raised (Figure 29), the pressure cam 110 at this time lying horizontally (Figure 27). Cam 112 has a stop face 112a which engages with the plate 101 to limit the movement of handle 108 in the counter-clockwise direction in Figure 29.

To close the clamp the handles 108 are rocked towards one another in Figure 25, the left hand handle being rocked clockwise in Figures 25 and 29 and counterclockwise in Figure 27. When handle 108 is thus rocked (Figures 27 and 29) cam 112 is moved away from arm 104 so that clamping member 102 moves to closed position under the action of gravity.

At the end of the movement of handle 108 back to the position shown in Figure 26 the pressure cam 110 gets under pin 111 and forces arms 103 downwardly thereby forcing clamping member 102 into firm contact with the material disposed between it and clamping member 101.

In order to increase the clamping grip the members 101 and 102 are lined with rubber indicated at 101a and 102a.

The lower clamping plate 101 is provided with slots 113 for engagement with the pins 90 on the carriage 12.

In order to load the clamp with a piece of material the clamp is placed on the bench 6 with the slots 113 engaging pins 114 upstanding from the bench (Figure 1). The clamp is then opened as described above, the previously stitched piece of material is removed, and the new piece inserted, after which the clamp is closed, removed from the bench 6 and re-attached to the carriage 12 by engagement of slots 113 with pins 90.

Mounted in a casing 120 attached to the wall 7 of the casing 1 is the needle holder 121 (Figure 10) which is reciprocably mounted in supports 122, 123 and driven from a shaft 124 through a crank disc 125 attached to said shaft, and connecting rod 126 pivoted to a lug 127 secured to the needle holder 121.

The shaft 124 is driven from the motor 126 through clutch 127, belt 128, pulley 129 on shaft 130 of a gearbox 131, the shaft 130 carrying a magnetic clutch 132 by which it can be connected to a shaft 133 which drives shaft 124 through a coupling 134.

Disposed within a casing 135 (Fig. 5) is a pair of bevelled wheels 136 through which shaft 133 drives a transverse shaft 137. Through another pair of bevelled wheels 138, shaft 137 drives a shaft 139 carrying the bobbin 140 which is of conventional form and cooperates with the needle in the needle holder 121 to form the stitches.

By means of the gears within the gear-box 131 (Fig. 9) which are of conventional form, shaft 130 also drives the cam shaft 21 which, within the gear-box, carries a series of gear wheels 141 of differing sizes, any one of which can be connected to shaft 130 by the following means:

Secured to shaft 130 is a worm 142 meshing with a worm wheel, not shown, on a spindle 143, said spindle carrying a second worm (not shown) which meshes with a worm wheel 144 on a shaft 145.

Slidable on shaft 145 is a pair of arms 146 carrying between them an idler wheel 147 meshing with a gear wheel 148 mounted on shaft 145 between the arms 146, the shaft 145 being provided with a long key-way 149 which engages a key on the wheel 148.

By means of a handle 150 the arms 146 can be rocked about shaft 145 to disengage the gear 147 from the gear 141 with which it is in mesh and then the arms 146 together with gears 147, 148, can be moved along shaft 145 to bring gear wheel 147 into register with the desired one of the gear wheels 141 after which handle 150 is rocked back to mesh the wheel 147 with the selected wheel 141, the selection being maintained by engagement of handle 150 with one or other of a series of slots 151 (Figure 5).

By this means the cams are driven at a speed relative to the needle speed such as to produce the required number of stitches per inch.

It will be understood that the length of each stitch will depend upon the amount of movement imparted to the material by the cams 23 and 25 at each stroke of the needle.

Behind the cam 23 is disposed a mercury switch 155 attached to a carrier 156 (Figure 7) pivoted at 157 to a fixed part 158 and urged counter-clockwise by a spring 159. The carrier 156 has a cam nose 160 which, in the stop position of the machine, is engaged by a pin 161 on the cam 23 which holds the carrier 156 against the action of spring 159 as shown in Figure 7 in which the mercury switch 155 connects contacts 162′, 163′ of leads 162 and 163, respectively, lead 163 connecting contact 163′ to a needle brake coil 176 and a tension release coil 177 (see also Figure 19).

Pivotally mounted on the rear face of the casing wall 7 (see Figures 4 and 31) is a single pole double throw mercury switch 164′ secured to an operating member 164 pivoted at 165. Superimposed upon the operating member 164 is a trigger 173 pivoted at 173a and urged counterclockwise by a spring and restrained by a trigger stop 173b secured to operating member 164. The mercury switch is normally in the position shown in Figure 19 where the mercury filling connects contacts 166′ and 167′ respectively, the lead 167 being from supply positive as shown in Figure 19 while the lead 166 is connected to a motor brake 175 hereinafter referred to.

By means of a manually operable handle 168 (Figures 3 and 4) the switch 164 can be rocked clock-wise in Figure 4 in which position the mercury filling connects contacts 167′ and 166a connected by lead 166b to the motor clutch 127 thereby energising the motor clutch 127 and setting the shaft 130 and cam shaft 21 into rotation.

As soon as shaft 21 starts to move, the pin 161 (Figure 7) moves away from the cam nose 160, thereby permitting spring 159 to rock the mercury switch 155 counterclockwise, whereby connection between contacts 162′ and 163′ is broken and connection between contact 162′ and a contact 171 is established, a lead 170 connecting contact 170′ to the needle clutch 132 and clamp magnet 91.

By this means the clamp magnets 91 and the needle clutch 132 are energised.

It will be seen that the rotation of operating member 164 brings the nose of trigger 173 in line with stop 172 (see Figure 4) so that when carriage 11 moves in a downward direction, the pin 172 engages the nose of trigger 173 and the trigger rotates about its pivot 173a without disturbing the position of the mercury switch.

Upon the return of carriage 11 in its upward direction the pin 172 engages the underside of trigger 173 which bearing against the trigger stop causes the operating member 164 to rotate counterclockwise, thus returning the manually operable handle 168 to its off position and tilting the mercury switch so that the mercury filling closes the contacts 166′, 167′ thereby disconnecting the motor clutch and energizing the motor brake.

The pins 90 whereby the clamp 101, 102 is located on the carriage 12 are so disposed that in the stop position of the machine the beginning S1 of the stitch path on the collar (shown diagrammatically in Figure 12) is in register with the needle so that at the commencement of the operation of the machine the needle commences its stitching operation at one end S1 of the stitch path which is to run round the edge of the collar as shown in dotted lines at S in Figure 12.

The contours of cams 23 and 25 are such that, due to the combined movement of the carriages 11 and 12, a given point on the carriage 12 will follow a path which is identical with the stitch path to be produced on the collar, and since, when attaching the clamp 101, 102, to the carriage 12 the beginning of the stitch path is in register with the needle carried by the holder 121, it follows that the combined movement of the carriages 11 and 12 under control of the cams will move the collar material held in the clamp past the needle along the required path.

As the shaft 21 approaches the end of a revolution, the carriage 11, in approaching the end of its upward movement, operates by means of a pin 172 and a trigger 173, the switch 164 to connect contact 167′ to the contact 166′ and to disconnect 166a.

By this means the motor clutch 127 is de-energised and a motor brake 175 is energised to stop the motor. As the cam 23 approaches its stop position and before roller 40 rides up the face 23a of said cam to permit carriage 11 to return to its uppermost position, the pin 161 rocking switch 155 to the position shown in Figure 7 whereby connection between contacts 162′ and 170′ is broken and connection between contacts 162′ and 163′ is made. By this means the needle clutch 132 and the clamp magnets 191 are de-energised. In addition a needle brake coil 176 and a tension release coil 177 are energised.

It will be understood that it is necessary to hold the needle clear of the clamp during the return of the carriage and while the clamp is being removed and replaced with a new piece of material therein and for this purpose the following mechanism is employed (Figures 3 and 11).

Secured to the needle operating shaft 124 is a circular disc of which a part 180 is made of brass or other non-magnetic material, while the remaining part 181 is made of steel or other magnetic material.

The steel part 181 is made thicker at its middle portion and is reduced in thickness towards its junctions with the non-magnetic part 180 as shown in Figure 3.

The disc runs between the poles of a magnet 182 energised by the coil 176 already referred to.

When the needle clutch 132 is de-energised thereby interrupting the drive to the needle and at the same time the coil 176 is energised, the magnetic field between the poles of magnet 182 stops the shaft 124 with the thickest section of the magnetic part 181 of the disc between the poles of magnet 182.

The magnetic part 181 of the disc is so positioned on shaft 124 that when the disc is in the position shown in Figure 11 the needle is retracted, that is to say, the needle holder is in the position shown in Figure 10.

When the coil 176 is energised the disc 180, 181 and therefore shaft 124 is stopped in the position shown in Figure 11.

The coil 177 actuates the thread tensioning mechanism to release the tension on the thread.

The tensioning mechanism is of conventional form (Figures 5 and 14–16) and comprises two discs 184 urged together by a spring 185 and separable to release the tension by means of an arm 186 pivoted at 187 and of which the other end 188 forms an armature to the coil 177.

The thread passes to the needle from cone 190 supported on a shelf 191, between the tensioning discs 184 around the pins 192 carried between the thread-slackening discs 193 secured to shaft 124, and thence through the guide 194 and through a hole (not shown) in the wall 7 to the eye of the needle.

At the end of a stitching operation on one collar the thread may be cut by hand. Alternatively mechanism of the form shown in Figures 17 and 18 may be employed.

In this mechanism a lever 195 is pivoted to the carriage 12 and 196 and has its upper end provided with two cutting blades 197, 198. Pivoted at 199 adjacent to the blade 197 is a movable blade 200 and pivoted adjacent the blade 198, at 201 is a second movable blade 202.

As the carriage 12 runs with carriage 11, a pin 203 on lever 195 engages a fixed cam 204 whereby lever 195 is rocked clockwise against the action of spring 205 which bears against the rod 206.

A part of the clamp C (plates 101, 102) is cut away at 207 leaving a nose 208 with which a trigger part 209 on blade 200 engaged as lever 195 rocks clockwise. By this means blade 200 is rocked clockwise (Figure 18) across blade 197, thereby severing the thread from the needle.

At the same time blade 202 is rocked counterclockwise across blade 198 by engagement of a face 210 on blade 200 with a corresponding face on blade 202, the blades 200 and 202 being connected by a tension spring 211. Blade 202 serves to sever the thread from the bobbin.

It may be required to stitch pieces of material of the same general shape, but varying in size, as for example, shirt collars, which in general appearance are identical but which differ in length, for example the front and the points of the collars may be identical, but the distance between the points may have to be decreased from a maximum to some variable smaller distance.

For this purpose each cam is divided into two separate parts as shown in Figures 20 to 22.

As shown in Figures 21 and 22 each of the cams 23 and 25 is replaced by two half-cams 223a, 223b, and 225a, 225b respectively, each half-cam corresponding to one half revolution of the complete cam.

The half-cams 223a and 225a are connected by a sleeve 226 keyed to shaft 21 and freely rotatable about said sleeve 226 is a second sleeve 227 carrying the half-cams 223b and 225b.

In order to secure the half-cams together a series of holes 228 is provided in each half-cam 225a, 225b so that the half-cams can be secured together in the desired angular relationship by means of a pin 229 inserted through the appropriate holes 228.

Owing to the progressively increasing radius of the cam 23 controlling the vertically moving carriage 11, the overlapping of the two half cams 223a, 223b will cause a step in the periphery to be presented to the cam follower roller 40 (Figure 3) carried by the block 41. In order to compensate for this step two cam follower rollers 40a, 40b (Figure 21) must be provided, one roller for each half-cam.

These follower rollers 40a and 40b must be so relatively positioned that the cam follower 40b for the second half-cam 223b meets the periphery of its half-cam while the roller 40a is still in engagement with the half-cam 223a, so that the control of the movement of block 41 is smoothly taken up by cam 223b.

It is therefore necessary that the follower roller 40b shall be adjustable on the block 41 to correspond with the height of the step in the periphery of the cam due to the relative angular adjustment of the half-cams 223a, 223b.

For this purpose the roller 40b is carried by a slide 40c mounted in guides 40d carried by the block 41.

Slide 40c can be secured in different positions by a pin 40c which can be passed through holes 40f in the slide 40c into corresponding holes in the block 41.

A spring, not shown, is disposed about the sleeve 226, said spring urging the cam portions 223a and 223b together.

The cam can be removed from the shaft 21 after unscrewing nut member 31 so that they can be replaced by cams of a different contour.

The overlapping of the two cam parts results in a shortening of the effective cam contour so that the stitching is completed before the cams have made a complete revolution. However, the pin 161 shown on cam 23 in Figure 7 is carried by a cam part 225b in Figures 20–22, and as soon as the stitching has been completed, said pin 161 operates the mercury switch 155 as already described above, whereby the needle brake coil 176 is energised to hold the needle withdrawn from the material for the remainder of the revolution of shaft 21.

According to a further feature of the invention, provision may be made for feeding material to the clamping device from rolls and apparatus for this purpose is diagrammatically illustrated in Figure 23.

With this arrangement the clamp itself acts as the feeding device and comprises as already described clamping members 101 and 102 of which the member 102 is carried at the outer ends of two pairs of arms 103.

The operating handles 108 and the pressure cam 110 and the raising cam 112 are omitted so that the arms 103 can freely rock about their pivots 105.

In this arrangement the electro-magnets 91 are not used to hold the clamp to the carriage but are employed instead to operate the clamping members. To this end each arm 104 carries an armature 230.

Mounted in conventional supports such as 231 are rolls 232 of material and the material M from these rolls is passed over a roller 233 mounted on a spindle 234 carried by supports (not shown) at the top of the casing 1 of the machine. The material M is passed down between the clamping members 101, 102 and the operation is as follows:

With the carriage 11 at the top of its stroke and the carriage 12 in its normal position to the left (as shown in Figure 3) the switch 168 is operated whereby the mechanism is set in motion as already described. The magnets 91 are energised and cause the clamping members 101, 102 to grip the material M which is thereby pulled down with the clamp and also moved laterally therewith so that the line of stitching corresponding to the shape of the clamp is formed in the material.

To permit lateral movement of the material the roller 233 is arranged so that it can freely slide on the spindle 234.

After the stitching has been completed and before the carriage 11 returns to its upper-most position, pin 161 of cam 23 operates switch 155 to de-energise magnets 91 so that the clamping member 101, 102 releases the material M. Thus, when carriage 11 rises to its upper-most position the clamping member 101, 102, rises without moving the material M.

Thus, at each operation a line of stitching corresponding to the shape of the clamp is produced in the material, these stitch sections of material being afterwards cut off.

I claim:

1. In a sewing machine a stitch forming device, a primary carriage, guides along which carriage slides for a distance in one direction corresponding to the length of work to be stitched, rotary cam means positively driving the said carriage said distance, means urging the carriage back to its starting position and permitted by said cam means to reassert itself at the completion of a sewing operation to return said carriage to its starting position, secondary guides on the primary carriage normal to the aforesaid guides, a secondary carriage reciprocable along said secondary guides, further rotary cam means rotating unidirectionally in unison with the aforesaid cam means, lever means operatively connecting said further cam means to said secondary carriage to transmit displacement to the secondary carriage in conformity with the profiling of said secondary cam means, work clamping means on said secondary carriage offering the work to said stitch forming device, a needle holder with said stitch forming device, means to reciprocate the holder, a rotary drive shaft for said needle-holder, and a magnetically unbalanced disc mounted on said shaft and running between the poles of an electro-magnet, whereby on energisation of said magnet said shaft is stopped in a predetermined position, an operative connection between the needle-holder and the drive shaft such that in the stop position of the shaft the needle-holder is held retracted from the material to be stitched, and means, on the cam controlling the primary carriage, to effect energisation of said magnet when the end of the stitch-path is reached.

2. In a sewing machine a stitch forming device, a primary carriage, guides along which carriage slides for a distance in one direction corresponding to the length of work to be stitched, rotary cam means positively driving the said carriage said distance, means urging the carriage back to its starting position and permitted by said cam means to reassert itself at the completion of a sewing operation to return said carriage to its starting position, secondary guides on the primary carriage normal to the aforesaid guides, a secondary carriage reciprocable along said secondary guides, further rotary cam means rotating unidirectionally in unison with the aforesaid cam means, lever means operatively connecting said further cam means to said secondary carriage to transmit displacement to the secondary carriage in conformity with the profiling of said secondary cam means, work clamping means on said secondary carriage offering the work to said stitch forming device, a needle holder with said stitch forming device, means to reciprocate the holder, a rotary drive shaft for said needle-holder, and a magnetically unbalanced disc mounted on said shaft and running between the poles of an electro-magnet, whereby on energisation of said magnet said shaft is stopped in a predetermined position, an operative connection between the needle-holder and the drive shaft such that in the stop position of the shaft the needle-holder is held retracted from the material to be stitched, and means, on the cam controlling the primary carriage, to effect energisation of said magnet when the end of the stitch-path is reached, said magnetically unbalanced disc having a sector made of magnetic material, while the remainder of the disc is made of non-magnetic material, and the magnetic sector is thicker at its middle part and tapers towards its junctions with the non-magnetic part so that on energisation of the magnet the disc is arrested with the thickest part of the magnetic sector between the magnet poles.

3. In a sewing machine a stitch forming device, a primary carriage, guides along which carriage slides for a distance in one direction corresponding to the length of work to be stitched, rotary cam means positively driving the said carriage said distance, means urging the carriage back to its starting position and permitted by said cam means to reassert itself at the completion of a sewing operation to return said carriage to its starting position, secondary guides on the primary carriage normal to the aforesaid guides, a secondary carriage reciprocable along said secondary guides, further rotary cam means rotating uni-directionally in unison with the aforesaid cam means, lever means operatively connecting said further cam means to said secondary carriage to transmit displacement to the secondary carriage in conformity with the profiling of said secondary cam means, work clamping means on said secondary carriage offering the work to said stitch forming device, a needle holder with said stitch forming device, means to reciprocate the holder, a rotary drive shaft for said needle-holder, and a magnetically unbalanced disc mounted on said shaft and running between the poles of an electro-magnet, whereby on energisation of said magnet said shaft is stopped in a predetermined position, an operative connection between the needle-holder and the drive shaft such that in the stop position of the shaft the needle-holder is held retracted from the material to be stitched, and means, on the cam controlling the primary carriage, to effect energisation of said magnet when the end of the stitch-path is reached, a main shaft driving said cam means, a drive shaft for the needle holder, clutch means connecting said two shafts and the main shaft to said cam means, the primary cam means effecting disengagement of the clutch means when the end of the stitching operation is reached, and means also operated by said primary cam means to close the circuit to the magnet for energising it to arrest the needle-holder in the retracted position at the end of the stitching operation.

4. In a sewing machine a stitch forming device, a primary carriage, guides along which carriage slides for a distance in one direction corresponding to the length of work to be stitched, rotary cam means positively driving the said carriage said distance, means urging the carriage back to its starting position and permitted by said cam means to reassert itself at the completion of a sewing operation to return said carriage to its starting position, secondary guides on the primary carriage normal to the aforesaid guides, a secondary carriage reciprocable along said secondary guides, further rotary cam means rotating uni-directionally in unison with the aforesaid cam means, lever means operatively connecting said further cam means to said secondary carriage to transmit displacement to the secondary carriage in conformity with the profiling of said secondary cam means, work clamping means on said secondary carriage offering the work to said stitch forming device, and thread-severing means fastened to said secondary carriage, a fixed cam, an abutment on the thread severing means which rides along the cam when the primary and secondary carriages commence to rise after the completion of a sewing operation to operate positively the severing means.

5. In a sewing machine a stitch forming device, a primary carriage, guides along which carriage slides for a distance in one direction corresponding to the length of work to be stitched, rotary cam means positively driving the said carriage said distance, means urging the carriage back to its starting position and permitted by said cam means to reassert itself at the completion of a sewing operation to return said carriage to its starting position, secondary guides on the primary carriage normal to the aforesaid guides, a secondary carriage reciprocable along said secondary guides, further rotary cam means rotating uni-directionally in unison with the aforesaid cam means, lever means operatively connecting said further cam means to said secondary carriage to transmit displacement to the secondary carriage in conformity with the profiling of said secondary cam means, a work holder on said secondary carriage comprising two hinged jaws having a contour corresponding to the shape of the stitch-path, electro-magnets, said jaws being closed by energisation of said electro-magnets when the primary carriage is at the upper end of its travel and released by de-energisation of the magnets under control of the carriage control cam when the end of the stitch-path is reached, a roll for the material, means being provided for inserting material from said roll into the jaws, so that during the stitching operation the material is drawn from the roll by the jaws, and released at the end of the stitch-path so that the carriages return to a starting position without carrying the material with them.

6. In a sewing machine a stitch forming device, a primary carriage, guides along which carriage slides for a distance in one direction corresponding to the length of work to be stitched, rotary cam means positively driving the said carriage said distance, means urging the carriage back to its starting position and permitted by said cam means to reassert itself at the completion of a sewing operation to return said carriage to its starting position, secondary guides on the primary carriage normal to the aforesaid guides, a secondary carriage reciprocable along said secondary guides, further rotary cam means rotating uni-directionally in unison with the aforesaid cam means, lever means operatively connecting said further cam means to said secondary carriage to transmit displacement to the secondary carriage in conformity with the profiling of said secondary cam means, work clamping means on said secondary carriage offering the work to said stitch forming device, a needle-holder with said stitch forming device, means to reciprocate the holder, a rotary drive shaft for said needle-holder, and a brake device mounted on said shaft and actuated to stop the shaft when the end of the stitch path is reached whereby said shaft is stopped in a predetermined position, an operative connection between the needle-holder and the drive shaft such that in the stop position of the shaft the needle-holder is held retracted from the material to be stitched, and remote control means actuated by the cam controlling the primary carriage, to operate the said brake when the end of the stitch-path is reached, both the said cam means comprising two cams, for respectively controlling the primary carriage and the secondary carriage and formed integral with one another as a unit so that they can be adjusted simultaneously to equal extents.

References Cited in the file of this patent

UNITED STATES PATENTS

| | | |
|---|---|---|
| 1,942,128 | Sommer | Jan. 2, 1934 |
| 2,572,635 | Lennox | Oct. 23, 1951 |
| 2,609,769 | Kramer | Sept. 9, 1952 |

FOREIGN PATENTS

| | | |
|---|---|---|
| 500,092 | Belgium | Feb. 29, 1952 |